(12) United States Patent
Struksnes et al.

(10) Patent No.: US 12,691,519 B2
(45) Date of Patent: Jul. 28, 2026

(54) CONTACT TIP CONTACT ARRANGEMENT FOR METAL WELDING

(71) Applicant: Norsk Titanium AS, Honefoss (NO)

(72) Inventors: Knut Struksnes, Gran (NO); Trond Forseth, Ringerike (NO); Arne Ramsland, Hole (NO); Andre Kristiansen, Ringerike (NO)

(73) Assignee: Norsk Titanium AS, Hønefoss (NO)

( * ) Notice: Subject to any disclaimer, the term of this patent is extended or adjusted under 35 U.S.C. 154(b) by 0 days.

(21) Appl. No.: 17/586,660

(22) Filed: Jan. 27, 2022

(65) Prior Publication Data

US 2022/0226921 A1 Jul. 21, 2022

Related U.S. Application Data

(63) Continuation of application No. 15/206,149, filed on Jul. 8, 2016, now Pat. No. 11,241,753.

(51) Int. Cl.
| | |
|---|---|
| *B23K 9/04* | (2006.01) |
| *B23K 9/095* | (2006.01) |
| *B23K 9/12* | (2006.01) |
| *B23K 9/173* | (2006.01) |
| *B23K 9/26* | (2006.01) |
| *B23K 9/29* | (2006.01) |
| *B33Y 10/00* | (2015.01) |
| *B33Y 30/00* | (2015.01) |
| *G05B 19/4099* | (2006.01) |

(52) U.S. Cl.
CPC .............. *B23K 9/044* (2013.01); *B23K 9/042* (2013.01); *B23K 9/0953* (2013.01); *B23K 9/122* (2013.01); *B23K 9/123* (2013.01); *B23K 9/1735* (2013.01); *B23K 9/26* (2013.01); *B23K 9/295* (2013.01); *G05B 19/4099* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | | | |
|---|---|---|---|---|
| 2,179,108 A | * | 11/1939 | Westberg | ............... B23K 9/123 |
| | | | | 219/137.61 |
| 4,309,590 A | | 1/1982 | Stol | |
| 4,482,797 A | | 11/1984 | Shiramizu et al. | |

(Continued)

FOREIGN PATENT DOCUMENTS

| | | |
|---|---|---|
| CN | 1370099 A | 9/2002 |
| CN | 1498711 A | 5/2004 |

(Continued)

OTHER PUBLICATIONS

Translation of DE-2949318-A1 (Year: 1981).*

(Continued)

*Primary Examiner* — Elizabeth M Kerr
(74) *Attorney, Agent, or Firm* — Lee & Hayes, P.C.

(57) ABSTRACT

A contact tip assembly having an electric contact unit containing a contact tip with an electric energy source, where the electric contact unit is positioned at a distance away from the outlet opening of a guide. The contact tip may be a replaceable tip that is biased or pressed into contact with a feed wire to apply a current from the electric energy source to the feed wire.

19 Claims, 12 Drawing Sheets

(56) References Cited

U.S. PATENT DOCUMENTS

| | | | | |
|---|---|---|---|---|
| 4,540,879 | A | 9/1985 | Haerther et al. | |
| 4,551,603 | A | 11/1985 | Rocklin | |
| 4,591,685 | A | 5/1986 | Hinger et al. | |
| 4,667,083 | A | 5/1987 | Stol | |
| 4,879,446 | A | 11/1989 | Morgan et al. | |
| 5,313,046 | A | 5/1994 | Zamuner | |
| 5,635,091 | A * | 6/1997 | Hori | B23K 9/123 |
| | | | | 219/136 |
| 5,707,693 | A | 1/1998 | Vliet et al. | |
| 5,973,291 | A | 10/1999 | Kramer et al. | |
| 6,344,287 | B1 | 2/2002 | Cellk et al. | |
| 6,559,416 | B1 * | 5/2003 | Steenis | B23K 9/123 |
| | | | | 219/137.61 |
| 7,381,923 | B2 * | 6/2008 | Gordon | B23K 9/123 |
| | | | | 219/137.61 |
| 7,892,597 | B2 | 2/2011 | Hooker et al. | |
| 2005/0016977 | A1 | 1/2005 | Taaler | |
| 2006/0081675 | A1 | 4/2006 | Enyedy | |
| 2006/0151453 | A1 | 7/2006 | Gordon et al. | |
| 2006/0185473 | A1 | 8/2006 | Withers et al. | |
| 2009/0047439 | A1 | 2/2009 | Withers et al. | |
| 2010/0193480 | A1 | 8/2010 | Adams | |
| 2014/0061165 | A1 * | 3/2014 | Stempfer | B22F 10/22 |
| | | | | 219/76.16 |
| 2015/0014282 | A1 * | 1/2015 | Raudsepp | B23K 9/173 |
| | | | | 219/74 |
| 2016/0107261 | A1 | 4/2016 | Guldberg | |

FOREIGN PATENT DOCUMENTS

| | | | | | |
|---|---|---|---|---|---|
| CN | 1935439 | A | 3/2007 | | |
| CN | 103476523 | A | 12/2013 | | |
| CN | 104114313 | A | 10/2014 | | |
| DE | 2949318 | A1 * | 6/1981 | | B23K 9/29 |
| DE | 3941980 | A1 | 6/1991 | | |
| EA | 201290093 | A | 3/2008 | | |
| EP | 0958061 | A1 | 11/1999 | | |
| EP | 1108491 | A2 | 6/2001 | | |
| EP | 2199005 | A1 | 6/2010 | | |
| JP | 53104549 | A | 9/1978 | | |
| JP | S53104549 | A | 9/1978 | | |
| JP | S56144876 | A | 11/1981 | | |
| JP | S58-033181 | A | 3/1983 | | |
| JP | S61-127875 | A | 8/1986 | | |
| JP | 04344873 | A | 12/1992 | | |
| JP | H04344873 | A | 12/1992 | | |
| JP | 05228631 | A | 9/1993 | | |
| JP | H05228631 | A | 9/1993 | | |
| JP | H11-277242 | A | 5/1999 | | |
| JP | H11123559 | A | 5/1999 | | |
| JP | 2006-519103 | A | 8/2006 | | |
| JP | 2013-146768 | A | 8/2013 | | |
| JP | 2014512961 | A | 5/2014 | | |
| KR | 20100057408 | A | 5/2010 | | |
| RU | 2318639 | C2 | 3/2008 | | |
| WO | WO9835760 | A1 | 8/1998 | | |
| WO | WO03039800 | A1 | 5/2003 | | |
| WO | WO2006133034 | A1 | 12/2006 | | |
| WO | WO2012134299 | A2 | 10/2012 | | |

OTHER PUBLICATIONS

The Canadian Office Action mailed Apr. 18, 2023 for Canadian patent application No. 3,030,045, a foreign counterpart of U.S. Pat. No. 11,241,753, 4 pages.

The Canadian Office Action mailed Apr. 18, 2023 for Canadian patent application No. 3,030,044, a foreign counterpart of U.S. Pat. No. 10,709,006, 4 pages.

Canadian Office Action mailed May 17, 2023 for Canadian Patent Application No. 3,030,045, a foreign counterpart to U.S. Pat. No. 11,241,753, 4 pages.

The Canadian Office Action mailed May 17, 2023 for Canadian patent application No. 3,030,044, a foreign counterpart of U.S. Pat. No. 10,709,006, 4 pages.

Australian Office Action mailed Jan. 21, 2022 for Australian Patent Application No. 2017294026, a foreign counterpart to U.S. Pat. No. 11,241,753, 4 pages.

Australian Office Action mailed Jan. 21, 2022 for Australian Patent Application No. 2017294025, a foreign counterpart to U.S. Pat. No. 10,709,006, 3 pages.

Chinese Office Action for Chinese Application No. 2017800423440, mailed on Oct. 30, 2020 , 15 pages.

The Chinese Office Action mailed Jun. 29, 2021 for Chinese Patent Application No. 2017800422202, a foreign counterpart to U.S. Appl. No. 15/206,149, 12 pages.

Chinese Office Action for Chinese Patent Application No. 2017800422202, issued Nov. 9, 2020, 11pages.

Search Report for CN Application 2017800422202, dated Oct. 29, 2020, 6 pages.

Search Report for CN 2017800423440, issued Oct. 22, 2020 (with translation), 5 pages.

The Notice of Allowance for SG 11201811254X, issued Jan. 20, 2021, 5 pages.

Eurasian Office Action mailed Oct. 25, 2021 for Eurasian Patent Application No. 201990015, a foreign counterpart to U.S. Appl. No. 15/206,149, 3 pages.

The Eurasian Office Action mailed on Nov. 29, 2019 for Eurasian Patent Application No. 201990015, a counterpart of U.S. Appl. No. 15/206,149, 3 pages.

The Eurasian Office Action mailed on Dec. 8, 2020 for Eurasian Patent Application No. 201990015, a counterpart of U.S. Appl. No. 15/206,149, 4 pages.

European Office Action mailed Nov. 10, 2020 for European Patent Application No. 17712084.7, a counterpart foreign application of U.S. Appl. No. 15/206,149, 6 pages.

Office Action mailed on Feb. 16, 2021 for counterpart Japanese Patent Appl. No. 2019-500539, 12 pages.

Japanese Office Action mailed Nov. 24, 2021 for Japanese Patent Application No. 2019-500569, a foreign counterpart to U.S. Pat. No. 10,709,006, 2 pages.

Japanese Office Action for Japanese Patent Application No. 2019-500539, mailed Feb. 16, 2021 12 pages.

JP Office Action from corresponding JP Application No. 2019500569 mailed Mar. 3, 2016, 5 pages.

Korean Office Action mailed Jan. 25, 2021 for counterpart Korean Patent Application No. 10-2019-7000535, 5 pages.

Korean Office Action mailed Jan. 25, 2021 for counterpart Korean Patent Application No. 10-2019-7000537, 4 pages.

Office action for U.S. Appl. No. 15/206,149, mailed on Nov. 9, 2020, Struksnes, "Contact Tip Contact Arrangement for Metal Welding", 14 pages.

Taminger & Hafley, "Characterization of 2219 Aluminum Produced by Electron Beam Freeform Fabrication," Aug. 5-7, 2002, pp. 482-489, Presented at the 13th Solid Freeform Fabrication Symposium, Austin, Texas.

Taminger & Hafley, "Electron Beam Freeform Fabrication: A rapid Metal Deposition Process," Sep. 9-10, 2003, Proceedings of the 3rd Annual Automotive Composites Conference, Troy, Michigan.

Taminger & Hafley, "Electron Beam Freeform Fabrication for Cost Effective Near-Net Shape Manufacturing", 2006, pp. 1-9, NATO/RTOAVT-139 Specialists' Meeting on Cost Effective Manufacture via Net Shape Processing, Amsterdam, the Netherlands.

* cited by examiner

CONTACT TIP CONTACT ARRANGEMENT FOR METAL WELDING

RELATED APPLICATIONS

This application is a continuation of U.S. patent application Ser. No. 15/206,149, titled "CONTACT TIP CONTACT ARRANGEMENT FOR METAL WELDING", filed Jul. 8, 2016, the subject matter of which is incorporated herein by reference in its entirety.

FIELD OF THE INVENTION

The present invention relates to a contact tip suited for electrically connecting and guiding a welding wire in metal inert gas welding (MIG-welding).

BACKGROUND OF THE INVENTION

Structured metal parts made of titanium or titanium alloys are conventionally made by casting, forging or machining from a billet. These techniques have a disadvantage of high material use of the expensive titanium metal and large lead times in the fabrication.

Fully dense physical objects may be made by a manufacturing technology known as rapid prototyping, rapid manufacturing, layered manufacturing, solid freeform manufacturing, additive fabrication, additive manufacturing or 3D printing. This technique employs computer aided design software (CAD) to first construct a virtual model of the object which is to be made, and then transform the virtual model into thin parallel slices or layers, usually horizontally oriented. The physical object may then be made by laying down successive layers of raw material in the form of liquid, paste, powder or other layerable, spreadable or fluid form, such as melted metal, e.g., from a melted welding wire, or preformed as sheet material resembling the shape of the virtual layers until the entire object is formed. The layers can be fused together to form a solid dense object.

Solid freeform fabrication is a flexible technique allowing creation of objects of almost any shape at relatively fast production rates, typically varying from some hours to several days for each object. The technique is thus suited for formation of prototypes and small production series, and can be scaled-up for large volume production.

The technique of layered manufacturing may be expanded to include deposition of pieces of the construction material, that is, each structural layer of the virtual model of the object is divided into a set of pieces which when laid side by side form the layer. This allows forming metallic objects by welding a wire onto a substrate in successive stripes forming each layer according to the virtual layered model of the object, and repeating the process for each layer until the entire physical object is formed. The accuracy of the welding technique is usually too coarse to allow directly forming the object with acceptable dimensions. The formed object will thus usually be considered a green object or pre-form which needs to be machined to acceptable dimensional accuracy.

Taminger and Hafley ("*Electron Beam Freeform Fabrication for Cost Effective Near-Net Shape Manufacturing*", NATO/RTOAVT-139 Specialists' Meeting on Cost Effective Manufacture via Net Shape Processing (Amsterdam, the Netherlands, 2006) (NATO). pp 9-25) discloses a method and device for manufacturing structural metal parts directly from computer aided design data combined with electron beam freeform fabrication (EBF). The structural part is built by welding on successive layers of a metallic welding wire which is welded by the heat energy provided by the electron beam. The EBF process involves melting a metal wire into a molten pool made and sustained by a focused electron beam in a high vacuum environment. The positioning of the electron beam and welding wire is obtained by having the electron beam gun and the actuator supporting the substrate movably hinged along one or more axis (X, Y, Z, and rotation) and regulate the position of the electron beam gun and the support substrate by a four axis motion control system. The process is claimed to be nearly 100% efficient in material use and 95% effective in power consumption. The method may be employed both for bulk metal deposition and finer detailed depositions, and the method is claimed to obtain significant effect on lead time reduction and lower material and machining costs as compared to the conventional approach of machining the metal parts. The electron beam technology has a disadvantage of being dependent upon a high vacuum of $10^{-1}$ Pa or less in the deposition chamber.

It is known to use a plasma arc to provide the heat for welding metallic materials. This method may be employed at atmospheric or higher pressures, and thus allow simpler and less costly process equipment. One such method is known as gas tungsten arc welding (GTAW, also denoted as TIG) where a plasma transferred arc is formed between a non-consumable tungsten electrode and the welding area. The plasma arc is usually protected by a gas being fed through the plasma torch forming a protective cover around the arc. TIG welding may include feeding a metal wire or metal powder into the melting pool or the plasma arc as a filler material.

Abbott et al. (WO 2006/133034, 2006) discloses a direct metal deposition process using a laser/arc hybrid process to manufacture complex three-dimensional shapes comprising the steps of providing a substrate and depositing a first molten metal layer on the substrate from a metal feedstock using laser radiation and an electric arc is disclosed. The electric arc can be provided by gas metal arc welding using the metal feedstock as an electrode. Abbott et al. teaches that the use of laser radiation in combination with gas metal arc welding stabilizes the arc and purportedly provides higher processing rates. Abbott et al. utilizes a metal wire guided by and exiting out of a wire guide. The metal of the metal wire is melted at the end and the molten metal is deposited by positioning the end over the deposition point. The required heat for melting the metal wire is supplied by an electric arc along with laser irradiation. Welding by melting a metal wire heated by an electric arc is known as gas metal arc welding (GMAW), of which in the case of using non-reactive gases to make the arc is also denoted as metal inert gas welding (MIG-welding).

One essential parameter in MIG-welding is to position the tip/end-section of the metal wire above the deposition point with great accuracy and also to ensure a stable and satisfactory electric contact with the consumable wire to enable having control with the melting rate and thus the deposition rate of the metal wire onto the workpiece/substrate. One solution to this problem is described by Westberg (U.S. Pat. No. 2,179,108, 1939). Westberg discloses an apertured copper nozzle from which a metal wire, in the form of a straightened out metallic wire being fed from a wire supply, is made to pass through at a controlled velocity. Both the copper nozzle and the workpiece are electrically connected to an electric power supply setting up an electric potential between them. When the metallic wire passes through the copper nozzle it comes into contact with the nozzle and is thus electrically connected to the electric power supply. When the tip (the end section) of the metallic wire reaches a certain distance above the deposition/welding area, the electric potential creates an electric arc extending from the tip of the metallic wire and down to the deposition/welding area. The electric arc melts the tip of the incoming metallic wire and thus deposits molten metallic material onto the deposition/welding area.

In order to ensure safe passage of the metal wire/metallic wire through the aperture/guiding channel of the copper nozzle it is necessary to have a somewhat larger diameter of the aperture than the metal wire. The relatively low mechanical contact between the copper nozzle and the metal wire has resulted in problems with inadequate electric contact between the metal wire and the wire guide, which has given problems with instable electric arcs and electric discharges/spark formations inside the aperture which has locally melted/torn off pieces of the metal wire and led to blockages of the aperture. These problems are taught to be solved in Westberg by having the end section of copper nozzle nearest the deposition are being shaped into a semi-cylinder by removing about half of the cylinder wall to enable pressing the metal wire down onto the semi-cylindrical guide channel by a spring loaded roller wheel and thus increase the electric contact area between the copper nozzle and metal wire. A similar solution is disclosed in Zigliotto (EP 1108491, 2001), which discloses a contact tip for MIG welding torches, comprising a body having connection means for fastening the body to a welding torch, and an axial hole for feeding the wire, the contact tip being provided with a V-shaped notch which extends from the outer wall to the axis, the axial hole leading to the bottom of the notch. The bottom of the notch is inclined and it deviates towards the axis adjacent to the nozzle. The contact tip of Zigliotto is provided with pressing means fitting inside the notch to press the welding wire against the notch bottom and walls, the pressing means consisting of a spring fitting into the notch and resting on the welding wire, the spring having means for coupling with the tip body.

Another solution of the same problem is known from Bednarz et al. (WO 2003/039800, 2003), which discloses a contact tip, suitable for electric arc welding using a metal wire, having a body that defines a bore through which the electrode is able to pass to enable electric current from a welding power supply to be transferred from the body to the electrode. In part of the length of the bore between an inlet end and an outlet end, the body has at least one region a primary contact region at which the body is adapted to enable primary electrical contact with the electrode. Along a remainder of the length of the bore, the body is adapted such that any secondary contact between the body and the electrode along the remainder part does not substantially short circuit the primary electrical contact in the primary contact region of the bore. In some embodiments in Bednarz et al., the part of the bore/guiding channel downstream of the body/electric contact being pressed onto the metal wire, may have a larger diameter to alleviate the passage of the metal wire. This downstream section of the guiding channel may also be electrically insulated from the main body of the contact tip by inserting an electrically insulating cylindrical material having a center bore.

According to the experience of the inventors, there are problems with clogging of the guidance channel due to spark erosion (unintended electric discharges) between the contact tip and metal wire which may form molten pearls of metal wire material inside the guidance channel which may clog the channel or lead to deviations in the positioning of the metal wire. There also exists a need in this art for an economical method of performing direct metal deposition. There further exists a need in this art for a method of increasing throughput and yield of direct metal deposition formed products.

SUMMARY OF THE INVENTION

An objective of the present invention is to provide a contact tip assembly for MIG-welding that significantly alleviates the problems related to spark erosion inside the guidance channel of the guide of the contact tip. Another objective of the invention is to provide a method for rapid layered manufacture of metal objects, particularly of objects containing Al, Cr, Cu, Fe, Hf, Sn, Mn, Mo, Ni, Nb, Si, Ta, Ti, V, W, or Zr, or composites or alloys thereof. Exemplary metal objects include titanium or a titanium alloy.

This invention addresses the needs for an improved, economical method of performing direct metal deposition. This invention further addresses the need for a method of increasing throughput and yield of distortion-free direct metal deposition formed parts with smooth, well-defined deposition boundaries.

The invention is based on the realization that the problem with clogging of the guide channel due to sparking or other causes can be significantly alleviated by electrically insulating the guide from the metal wire and employing a separate electric contact to supply the electric current to the metal wire. In the systems, devices and methods provided herein, a consumable contact tip is separate and apart from the guide, and the metal wire is brought into contact with the contact tip after the metal wire has passed through an end portion of the guide. It is noted that although the invention is described in correlation with the use of a metal wire, any conductive structure that can be guided and melted to deposit material can be used, for example any consumable electrode of appropriate size and shape can be used.

Referring to FIGS. 1A through 7B, provided is a contact tip assembly 100, which includes a guide 120 having a longitudinal center axis A-A', a first end 140, and an opposite second end 150, and a center bore 130 extending and running along the longitudinal center axis of the guide 120 from its first end 140 to its second end 150. The contact tip assembly 100 also can include an electrically insulating lining 160 that is inside of the center bore 130 and that extends at least from the first end 140 to the second end 150 of the guide 120. The electrically insulating lining 160 includes a guide channel 170 having an inlet opening 145 at the first end 140 and an outlet opening 155 at the second end 150 and running through the linear electrically insulating lining 160 along the longitudinal center axis A-A', and the electrically insulating lining 160 guides a metal wire 180 being passed through the linear cylindrical guide channel 170 from the inlet opening 145 towards and further out of the outlet opening 155. The contact tip assembly 100 also includes an electric contact unit 200 containing a contact tip 215 in electric contact with an electric energy source. The electric contact unit 200 can be positioned within a cut out section 115 that exposes the metal wire 180 to the contact tip 215 of the electric contact unit 200, as illustrated in FIG. 1A. The electric contact unit 200 can be positioned at a distance away from the outlet opening 155, as illustrated in FIGS. 2, 3, 4A and 5. The assembly can include a contact element pressing assembly 210 for pressing the contact tip 215 of the electric contact element 200 onto the metal wire 180, as illustrated in FIGS. 1A, 2 and 3. The assembly can include a wire pressing assembly 190 for pressing the metal wire 180 into contact with the contact tip 215 of the electric contact element 200, as illustrated in FIGS. 4A and 5. The assembly can include a wire pressing assembly 190 and a contact element pressing assembly 210 (not shown in the figures).

The contact tip assembly can include a bottom opening 125 in the bottom of the guide 120, as illustrated in FIGS. 1B and 4B. The bottom opening 125 allows dust or pieces of wire to exit the guide 120 prior to coming near the forming piece. The bottom opening 125 can extend to the second end 150 to form a channel. The guide 120 can be made of or include Al, Cr, Cu, Fe, Hf, Sn, Mn, Mo, Ni, Nb, Si, Ta, Ti, V, W, or Zr, or composites or alloys or combinations thereof. An exemplary guide 120 can be made of or include titanium or a titanium alloy.

The contact tip 215 can be made of or include Cu or a Cu alloy or a Cu composite. In some embodiments, the contact tip 215 includes a Cu/W composite.

When a guide 120 includes an electrically insulating lining 160 that forms the guide channel 170, a coating 165 can be included on the surface of the electrically insulating lining 160, as illustrated in FIGS. 6A-7B. The coating 165 faces the metal wire 180 as the metal wire 180 passes through the guide channel 170. The contact tip assembly provided herein also can include an insulating tip 195 on the surface of the wire pressing assembly 190 that comes into contact with the metal wire 180. An exemplary embodiment is illustrated in FIGS. 4A and 4B.

An exemplary system that contains the contact tip assembly provided herein is illustrated in FIG. 12. The electric contact unit 200 can include an electrical connection 230 that connects the contact tip 215 to a power source and an insulator connector 240 that connects the contact tip 215 to a contact tip support 220. The contact tip assembly also can include a cut-out section 115 that exposes the metal wire 180 to the contact tip 215 of the electric contact unit 200.

As shown in FIG. 12, the contact tip assembly provided herein also can include a support element 300 to which the guide 120 and the electric contact unit can be connected for support; a metal wire deliver source 400; and a frame 500 to which the support element 300 can be fastened. A thermally insulating material 310 can be present between all connections. FIG. 12 shows a thermally insulating material 310 between the support element 300 and the guide 120, and between the support element 300 and the frame 500. The contact tip assembly generally is positioned so that after the metal wire 180 passes through the guide 120 the metal wire 180 is positioned in a plasma arc of a plasma transfer arc (PTA) torch above a deposition point of a workpiece. In the contact tip assembly provided herein, the contact tip 215 can be isolated spatially from the PTA torch.

Also are provided are methods for providing an electric current to a metal wire during manufacturing of a three-dimensional object of a metallic material by solid freeform fabrication, the methods including feeding a metal wire through a guide; providing a contact tip that is separate and apart from the guide; and contacting the metal wire with the contact tip after the metal wire has passed through an end portion of the guide.

Also provided are methods for manufacturing a three-dimensional object of a metallic material by solid freeform fabrication. The methods include depositing successive deposits of a metallic material onto a base material, where each successive deposit is obtained by feeding a metal wire through a guide into an electric contact unit configured to contact the metal wire with a contact tip past the end of the guide; using a PAW torch to heat and melt the wire such that molten metallic material drips onto the preheated area of the base material; and moving the base material and/or the PAW torch in a predetermined pattern such that the successive deposits of molten metallic material solidifies and forms the three-dimensional object. Optionally, a second PAW torch can be used to preheat the base material at the position at which the metallic material is to be deposited. In some embodiments, at least a portion of the base material is melted during preheating to make the base material more receptive. Preheating promotes fusion between the base material and the melted metallic material by deepening the melt-in in the base material. In some embodiments, sufficient heat is applied during preheating to form a molten pool in the base material where the metallic material is to be deposited. The metal wire can be in the form of any wire. The metal wire can be or contain Al, Cr, Cu, Fe, Hf, Sn, Mn, Mo, Ni, Nb, Si, Ta, Ti, V, W, or Zr, or composites or alloys thereof. In some embodiments, the metal wire is a wire that contains Ti or a Ti alloy.

Also provided are systems for manufacturing a three-dimensional object of a metallic material by solid freeform fabrication. The systems can include a guide for guiding a metal wire into position above a base material; a contact tip arranged to contact the metal wire past an end of the guide; a welding torch to melt the wire onto a base material; and a computer model of the object to be formed to define a deposition profile such that a physical object is built by fusing successive deposits of the melted wire onto the base material. metal wire. The systems can further include an actuator tray that moves the base material relative to at least the welding torch. The systems can also include an actuator arm that moves the welding torch. In addition, a second welding torch can also be used to preheat the base material at a location over which the wire is melted. The second welding torch can also be moved by an actuator.

Additional features and advantages of the invention will be set forth in the description which follows, and in part will be apparent from the description, or can be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. For clarity, the figures are not to scale and some components are omitted.

In the drawings:

In FIG. 6A, the cross-section of the electrically insulating lining 160 and the guide 120 are circular. In FIG. 6B, the cross-section of the electrically insulating lining 160 is square and the guide 120 is circular. FIGS. 6A and 6B show the position of optional coating 165 on the electrically insulating lining 160.

In FIG. 7A, the cross-section of the electrically insulating lining 160 and the guide 120 are square. In FIG. 7B, the cross-section of the electrically insulating lining 160 is circular and the guide 120 is square. FIGS. 7A and 7B show the position of optional coating 165 on the electrically insulating lining 160.

DETAILED DESCRIPTION

A. Definitions

Figures 1A, 1B:
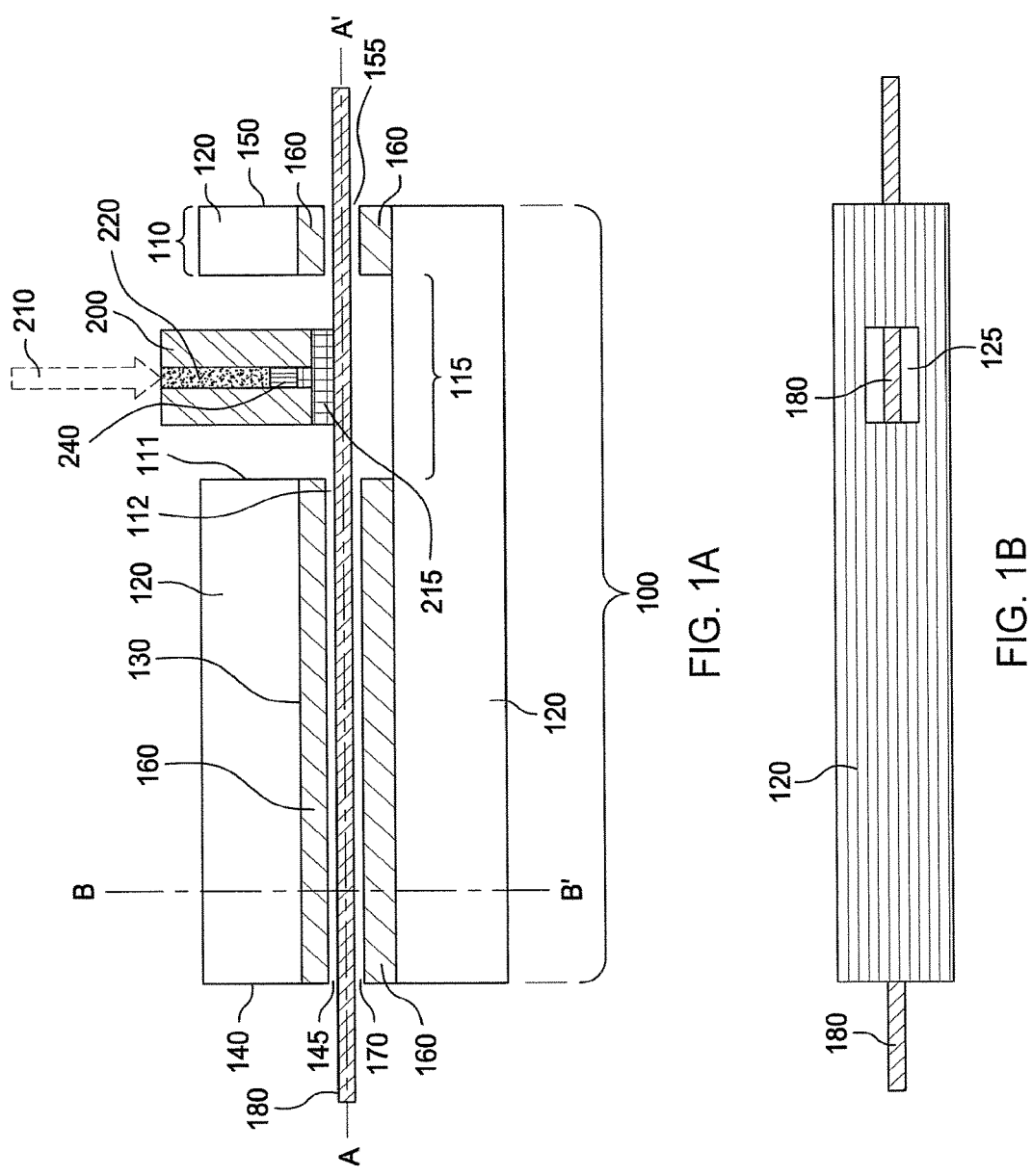
FIG. 1A is a schematic drawing showing a side sectional view of an embodiment of the guide 120 of the contact tip assembly 100 showing the location of a cut out section 115 in the top portion of the guide 120 that can accommodate a portion of the electric contact element 200. In the embodiment shown, the cut out section 115 does not extend to the end of the guide 120, resulting in a distal extension 110 of the top section.
FIG. 1B is a schematic drawing showing a bottom view of an embodiment of the guide 120 of the contact tip assembly 100 showing a bottom opening 125 that allows dust or pieces of wire to exit the guide 120 prior to coming near the forming piece.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, a "combination" refers to any association between two items or among more than two items. The association can be spatial or refer to the use of the two or more items for a common purpose.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a nozzle) to form a constricted plume that extends out of the orifice and transfers the intense heat of the arc to a target region. The electrode and target region can be electrically connected to a power source such that the electrode of the PTA torch becomes the cathode and the target region becomes the anode. This will ensure that the plasma plume including electric arc is delivering a highly concentrated heat flow to a small surface area of the target region with excellent control of the areal extension and magnitude of the heat flux being supplied from the PTA torch. A plasma transferred arc torch has the advantage of providing stable and consistent arcs with little wandering and good tolerance for length deviations between the cathode and anode. Thus, the PTA torch is suitable both for forming heating the base material, e.g., to melt at least a portion thereof or to form a molten pool in the base material, as well as to heat and melt the metallic wire feed. The PTA torch may advantageously have an electrode containing tungsten and a nozzle containing copper. However, the invention is not tied to any specific choice or type of PTA torch. Any known or conceivable device able to function as a PTA torch providing a stable heat source for melting the metal electrode wire can be used. As used herein, a "Plasma Arc Welding torch" or "PAW torch" refers to a welding torch that can be used in plasma arc welding. The torch is designed so that a gas can be heated to a high temperature to form plasma and becomes electrically conductive, the plasma then transfers an electric arc to a workpiece, and the intense heat of the arc can melt metal and/or fuse two pieces of metal together. A PAW torch can include a nozzle for constricting the arc thereby increasing the power density of the arc. The plasma gas typically is argon. Plasma gas can be fed along an electrode and ionized and accelerated in the vicinity of a cathode. The arc can be directed towards the workpiece and is more stable than a free burning arc (such as in a TIG torch). The PAW torch also typically has an outer nozzle for providing a shielding gas. The shielding gas can be argon, helium or combinations thereof, and the shielding gas assists minimizing oxidation of the molten metal. Current typical up to 400 A, voltage typical 25-35 V (up to app. 14 kW). PAW torches include plasma transferred arc torches.

The term "metallic material" as used herein refers to any known or conceivable metal or metal alloy which may be formed into a wire and employed in a solid freeform fabrication process to form a three-dimensional object. Examples of suitable materials include, but are not limited to, titanium and titanium alloys such as i.e. Ti-6Al-4V alloys, nickel and nickel alloys and other metals or metal alloys.

The term "base material" as used herein refers to the target material upon which metallic material is to be deposited. This will be the holding substrate when depositing the first layer of metallic material. When one or more layers of metallic material have been deposited onto the holding substrate, the base material will be the upper layer of deposited metallic material that is to have deposited a new layer of metallic material.

The term "holding substrate" as used herein refers to the target substrate that is first loaded into the chambers upon which additional material, the same or different from that of the holding substrate, is deposited using the technique of SFFF of solid free form fabrication to form a workpiece. In exemplary embodiments, the holding substrate is a flat sheet. In alternative embodiments, the holding substrate may be a forged part. In alternative embodiments, the holding substrate may be an object upon which additional material is to be deposited. In exemplary embodiments, the holding substrate can become part of the workpiece. The material for the holding substrate can be a metal or a metal alloy. In exemplary embodiments, the holding substrate is made of the same metal as the wire feed material.

As used herein, the term "workpiece" refers to a metal body being produced using solid free form fabrication.

The term "computer assisted design model" or "CAD-model" as used interchangeably herein refers to any known or conceivable virtual three-dimensional representation of the object that is to be formed which may be employed in the control system of the arrangement according to the second aspect of the invention: to regulate the position and movement of the holding substrate and to operate the welding torch with integrated wire feeder such that a physical object is built by fusing successive deposits of the metallic material onto the holding substrate in a pattern which results in building a physical object according to the virtual three-dimensional model of the object. This may for instance be obtained by forming a virtual vectorized layered model of the three-dimensional object by first dividing the virtual three-dimensional model into a set of virtual parallel horizontal layers and then dividing each of the parallel layers into a set of virtual quasi one-dimensional pieces. Then, the physical object may be formed by engaging the control system to deposit and fuse a series of quasi one-dimensional pieces of the metallic material feed onto the supporting substrate in a pattern according to the first layer of the virtual vectorized layered model of the object. Then, repeating the sequence for the second layer of the object by depositing and fusing a series of quasi one-dimensional pieces of the weldable material onto the previous deposited layer in a pattern according to the second layer of the virtual vectorized layered model of the object. The deposition continues based on the repetition of the deposition and fusing process layer by layer for each successive layer of the virtual vectorized layered model of the object until the entire object is formed.

However, the invention is not tied to any specific CAD-model and/or computer software for running the control system of the arrangement according to the invention, and nor is the invention tied to any specific type of control system. Any known or conceivable control system (CAD-model, computer-aid manufacturing (CAM) system or software, computer software, computer hardware and actuators etc.) able to build metallic three-dimensional objects by solid freeform fabrication may be employed. In exemplary embodiments, the control system can be adjusted to separately operate a first PAW torch to preheat the base material and a second PAW torch to melt the feed wire of metallic material onto the preheated area of the base material. The first PAW torch can preheat the base material so that it is receptive to molten drops of melted metal wire, i.e. melted metallic material, at the position at which the melted metallic material is to be deposited. In some embodiments, the preheating does not melt the base material. In alternative embodiments, at least a portion of the base material is melted by the first PAW to make the base material more receptive. In some embodiments, sufficient heat is applied by the first PAW torch to form a molten pool in the base material at the position at which the metallic material is to be deposited.

Positioning of the base material and any one or more PAW torches can be accomplished using one or more actuators. In exemplary embodiments, the base material can be repositioned or moved using an actuator tray over which the base material is resting. The actuator tray can move the base material in any direction. In exemplary embodiments the actuator tray can be set on a track or rail system and able to move the base material in any desired direction. Alternatively, the actuator tray may be operated using a mechanical or robotic arm. The actuator may also be operated using hydraulics. Similarly, the one or more PAW torches may be moved using one or more actuators. For example, each of the one or more PAW torch may be attached to an independently controlled actuator arm, such as a robotic or mechanical arm. Use of other types of mechanisms for the actuator arm can also be implemented, such as for example rail or track systems. The actuators may also be operated using hydraulics. In exemplary embodiments in which two or more PAW torches are used, each PAW torch can be moved independently. In alternative embodiment using two or more PAW torches, the position of two or more PAW torches can be fixed relative to each other and one or more actuator arms move the two or more PAW torches simultaneously. In exemplary embodiments, the actuator tray is the only actuator used, keeping the one or more PAW torches at a fixed position during deposition. In alternative embodiments, the actuator tray moves the base material only within two direction in one plane, while one or more actuator arms move the one or more PAW torches in only one direction, for example perpendicularly to the plane in which the actuator tray moves. The opposite may also be true, where the one or more actuator arms move the one or more PAW torches in two directions within a plane while and the actuator tray moves the base material along a single direction. In alternative embodiments, the base material is maintained in a fixed position during deposition, and one or more actuator arms are used to move the one or more PAW torches. In yet an alternative embodiment, an actuator tray and one or more actuator arms are all used to move the base material and the one or more PAW torches.

B. Contact Tip Assembly

Provided are systems and methods for manufacture of near net shape metal bodies using solid free form fabrication, the systems and methods utilizing a contact tip assembly that significantly alleviates the problems related to spark erosion inside the guide channel of the guide. Build up within the guide channel caused by sparking can result in random electrical connection and physical movement within the guide channel and can result in depositions within the guide channel that can interfere with or prevent movement of the metal wire through the guide. The inventors have determined that the problem with clogging of the guide channel due to sparking or other causes or deflection of the metal wire due to deformities in the guide channel due to build-up caused by sparking can be significantly alleviated by electrically insulating the guide from the metal wire, and using a separate electric contact to supply the electric current to the metal wire. In the systems, devices and methods provided herein, a consumable contact tip is separate and apart from the guide, and the metal wire is brought into contact with the contact tip after the metal wire has passed through an end portion of the guide.

The contact tip assembly provided herein includes a guide, a metal wire delivery source the provides the metal wire to the guide, and an electric contact element that electrically connects the wire to the electric power supply. The guide is electrically insulated from the metal wire, and a separate electric contact unit supplies the electric current to the metal wire via a contact tip of the electric contact unit. The guide can be of any material compatible with plasma arc welding. In some embodiments, the guide is or contains titanium or a titanium alloy containing Ti in combination with one or a combination of Al, V, Sn, Zr, Mo, Nb, Cr, W, Si, and Mn. For example, exemplary titanium alloys include Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, and Ti-48Al-2Nb-0.7Cr-0.3Si.

The contact tip is or contains copper or a copper alloy. The copper alloy can contain any of copper ASTM Classes II through X. The copper alloy can include copper in combination with any one of Ag, Al, Be, Bo, Cr, In, Mg, Ni, Sn, Sr, W, Zn or Zr, or combinations thereof. For example, the contact tip can include a sintered composition of W and Cu, or an alloy of Cu and W. In exemplary embodiments, the contact tip may have a curved or semi-curved surface where it contacts the wire. The curved, or semi-curved surface can be sized appropriately to accommodate the wire to be contacted. For example, for a wire having a diameter of about 1.6 mm, the contact tip may have a curved or concave surface having a diameter of about 1.8 mm. Also, the surface area of the contact tip can be large enough to help avoid overheating caused by the current transfer. In exemplary embodiments, the width or thickness of the contact tip can range from about 1 mm to about 10 mm.

Figure 12:
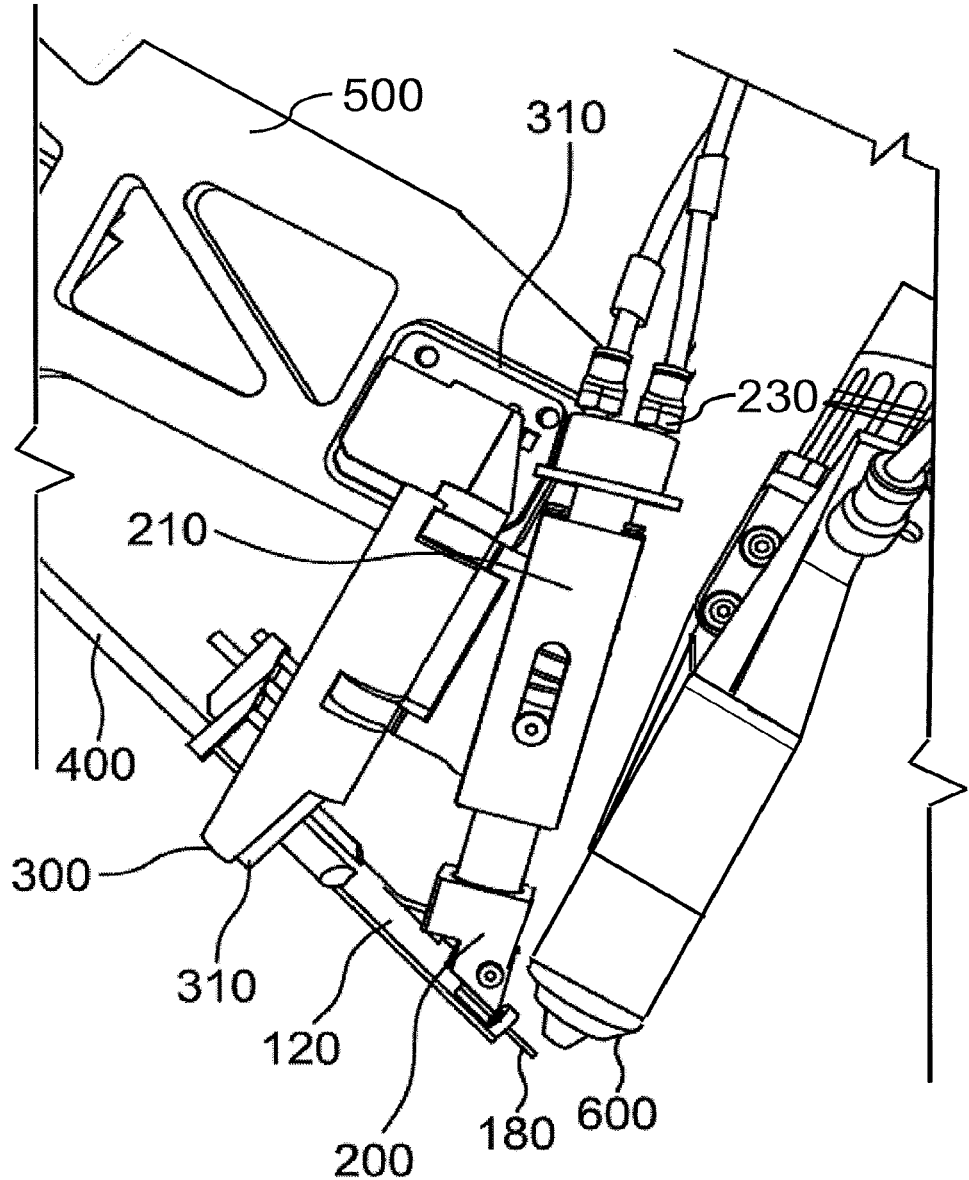
FIG. 12 is a drawing showing a side view of an embodiment of a system that includes the contact tip assembly 100 provided herein.

An exemplary embodiment of a system containing the contact tip assembly provided herein is shown in FIG. 12. In the exemplary system depicted in FIG. 12, the contact tip assembly includes a guide 120 and an electric contact unit 200 positioned above the guide 120. The electric contact unit 200 contains a replaceable contact tip 215 (not shown in the figure) and electrical connection 230 for connecting the contact tip 215 with a power source, such as a DC power source. The electric contact unit 200 can include a contact tip pressing assembly 210 that can exert a downward pressure against a contact tip support 220 to press the contact tip 215 into contact with the metal wire 180. The downward pressure to keep the contact tip 215 into contact with the metal wire 180 can be achieved, for example, by using a spring, hydraulics, pneumatic actuators, mechanized screws or a motorized piston assembly or any combination thereof. When the contact tip support 220 presses the contact tip 215 into contact with the metal wire 180, an electric circuit with a PTA torch 600 can be completed.

The guide 120 and the electric contact unit 200 are shown connected to a support element 300. The guide 120 and the electric contact unit 200 are thermally isolated from the support element 300 by including a thermally insulating material 310 between the contact points. The support element 300 is shown attached to a frame 500. It should be understood that support element 300 and frame 500 are simply illustrative. Other supporting structures also can be used. A metal wire delivery source 400, also electrically insulated, provides a metal wire 180 to one end of the guide 120. The metal wire 180 passes through the guide 120 and exits the other end of the guide 120, where it is positioned in the plasma arc above the deposition point of the workpiece. With the exemplary configuration provided herein, there is a single point of contact between the metal wire and the contact tip of the electric contact unit. This allows a stable contact point to be maintained. This also promotes stable resistive preheating of the metal wire wire before coming into contact with the arc and being melted.

Figure 6A:
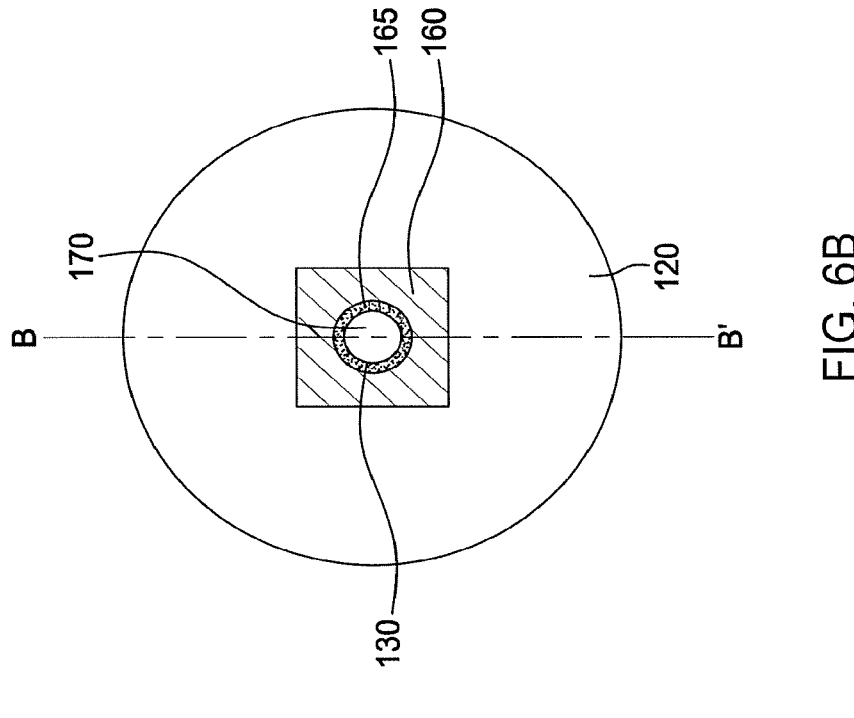
FIGS. 6A and 6B are schematic drawings showing a cross-sectional frontal view of embodiments of the guide 120 of the contact tip assembly 100.
Figure 6B:
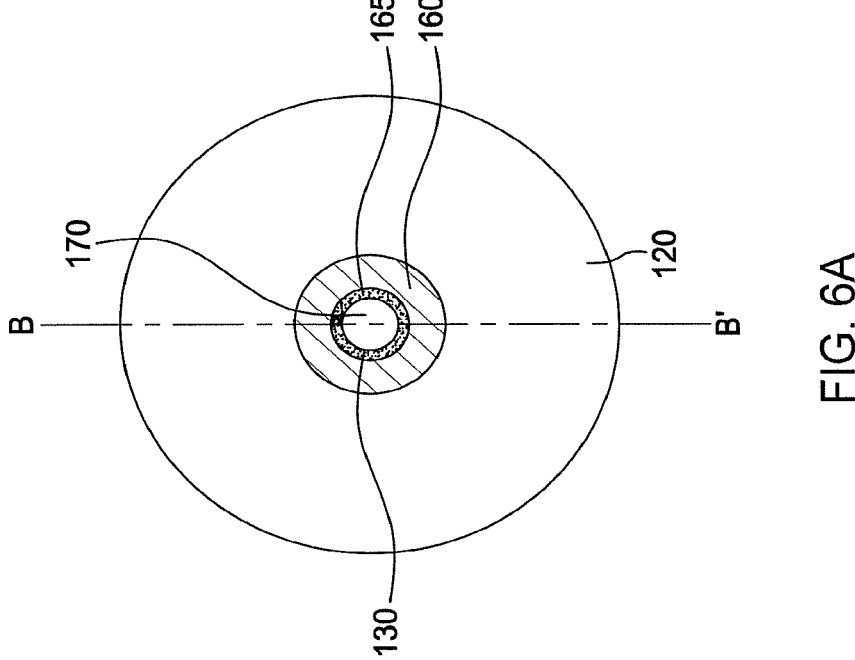
Figure 7B:
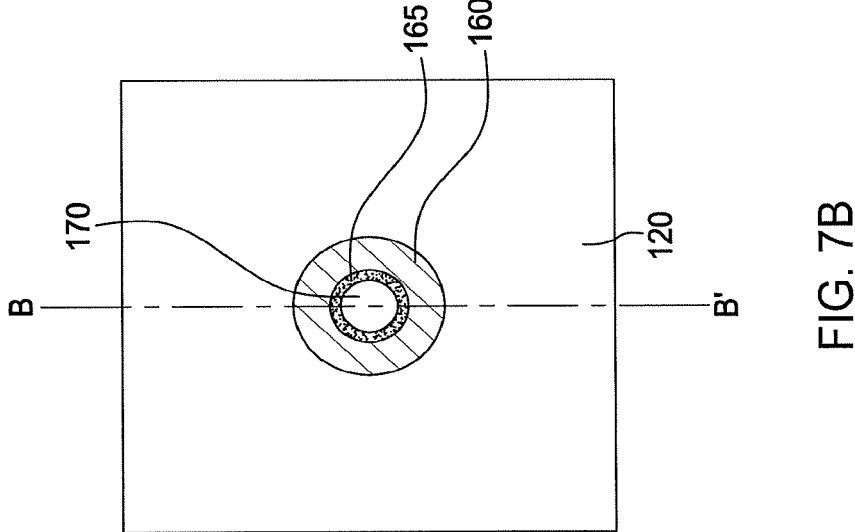
FIGS. 7A and 7B are schematic drawings showing a cross-sectional frontal view of embodiments of the guide 120 of the contact tip assembly 100.
Figure 7A:
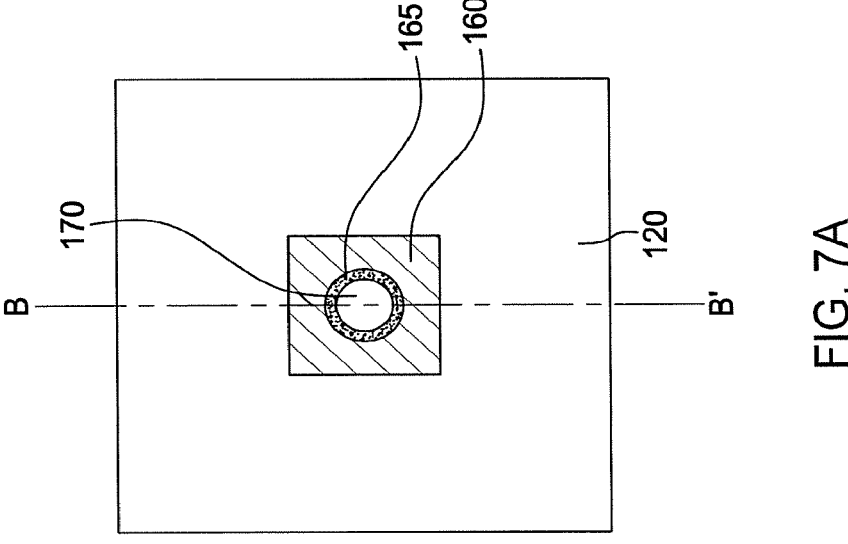
Figure 8:
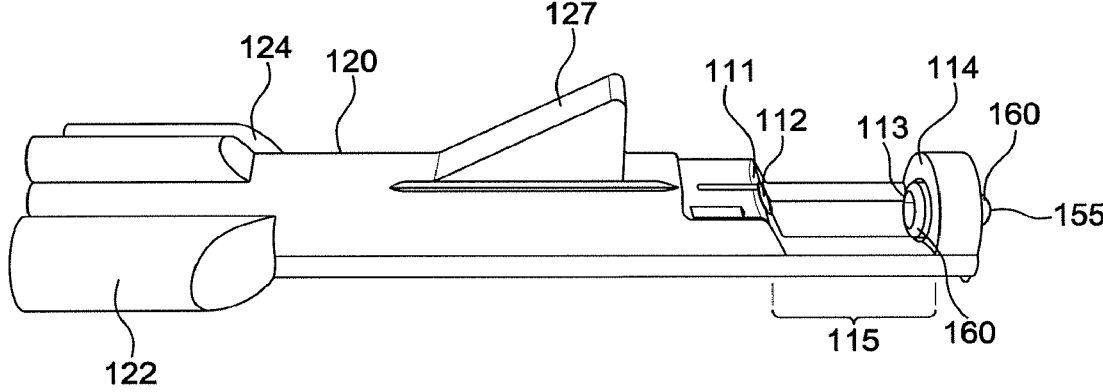
FIG. 8 is a drawing showing a side view of an embodiment of the guide 120 of the contact tip assembly 100.

The guide 120 can be of any shape, as long as it is configured to receive a metal wire 180 and allow the metal wire 180 to pass through the guide 120 without hindrance. An exemplary guide 120 is shown in detail in FIGS. 8-11. As depicted in FIG. 8, the guide 120 can have a generally cylindrical shape to accommodate a metal wire 180 that is in the form of a wire with a substantially circular cross section. The shape of the outer portion of the guide 120 can have a cross section that is circular, oval, elliptical, or polygonal, for example, square, triangular, rectangular, pentagonal, hexagonal, octagonal, or any combination thereof. In FIGS. 6A and 6B, the cross-section of the guide 120 is shown as circular. In FIGS. 7A and 7B, the cross-section of the guide 120 is shown as square.

In an exemplary embodiment, the guide 120 can be fluid cooled. For example, the guide can be designed to include an internal path for fluid flow through the guide. The fluid can be any suitable fluid, such as water, a $C_1$-$C_5$ alcohol, a polyalphaolefin, an alkylene glycol, such as ethylene glycol or propylene glycol, or mixtures thereof. In some embodiments, the cooling fluid is water, a mixture of water and propylene glycol, or a mixture of water and ethylene glycol. The cooling fluid can include additives, such as salts, corrosion inhibitors, pH adjusters or combinations thereof.

The guide can include projections or protrusions from the outer surface, such as to align the guide, or to allow attachment of the guide to a support or to other elements. As shown in FIG. 8, which shows a side view of the guide 120, the guide 120 can include fastener projections 122 and 124 for connecting the guide 120 to the support element 300 (as shown in FIG. 12). The fastener projections 122 and 124 can be threaded to accommodate a bolt or screw that can be used to attach the guide 120 to the support element 300. The guide 120 can include a protrusion 127 that can engage with and/or guide the placement of the electric contact unit 200.

As show in FIG. 8, the guide 120 can include a cut out section 115 in the upper portion of the guide 120 that can accommodate a portion of the end of the electric contact unit 200. The cut out section 115 results in the formation of a cut out first wall 111 that contains a cut out entry opening 112, and a cut out second wall 114 that contain a cut out exit opening 113. The metal wire 180 enters the cut out section 115 via cut out entry opening 112 and exits the cut out section 115 via cut out exit opening 113, ultimately exiting the guide 120 via outlet opening 155.

Figure 9:
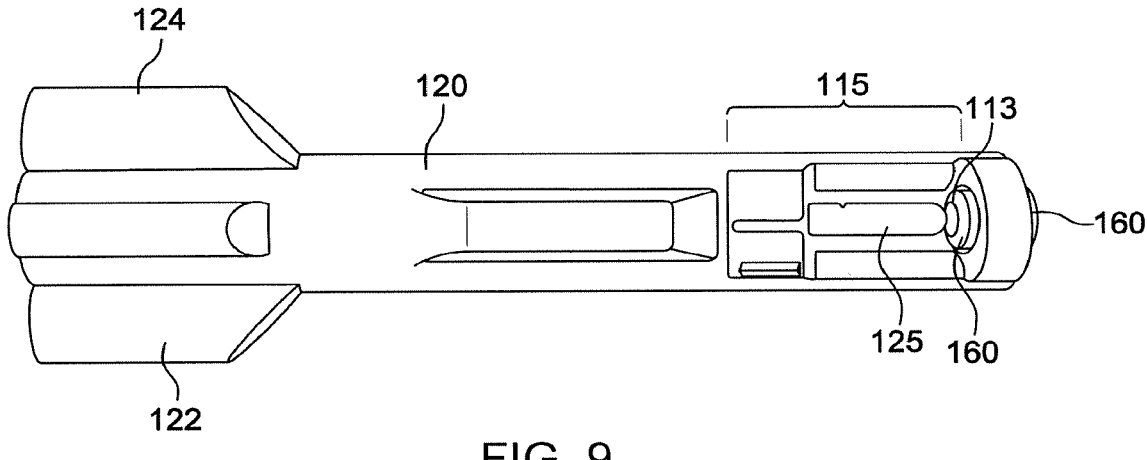
FIG. 9 is a drawing showing a top view of an embodiment of the guide 120 of the contact tip assembly 100.
Figure 10:
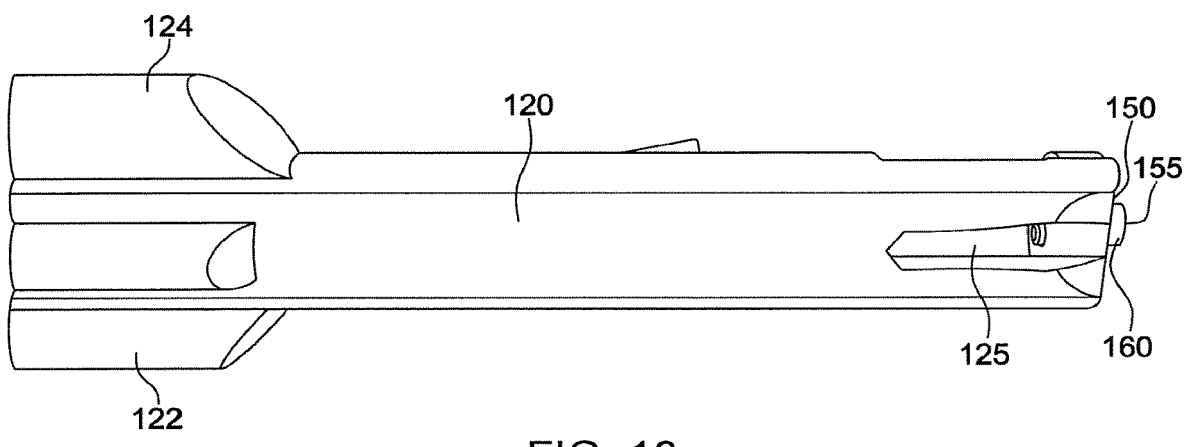
FIG. 10 is a drawing showing a bottom view of an embodiment of the guide 120 of the contact tip assembly 100.

FIG. 9 shows a top view of the guide 120. As shown in the figure, the guide 120 can include a bottom opening 125 beneath the cut out section 115. The bottom opening 125 allows any dust or particles of the metal wire 180 to exit the guide 120 prior to coming near the forming piece. The bottom opening 125 can extend to the second end 150 of the guide 120, as shown in FIG. 10.

Figure 11:
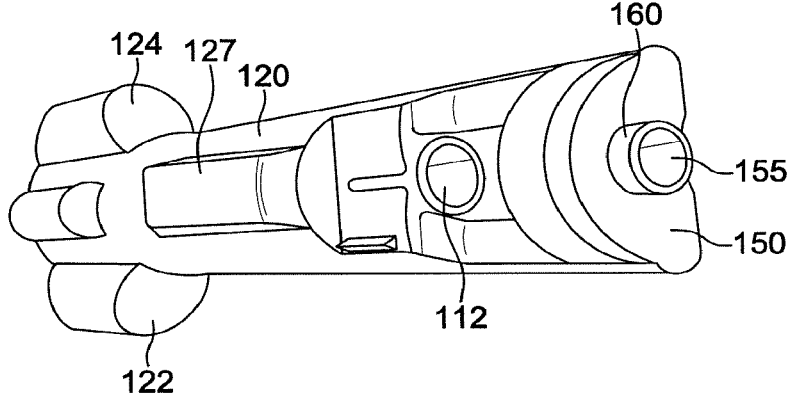
FIG. 11 is a drawing showing a front view of an embodiment of the guide 120 of the contact tip assembly 100.

FIG. 11 shows a skewed front view of the guide 120. This view illustrates an embodiment where the electrically insulating lining 160 extends from the second end 150 of the guide 120. The metal wire 180 is surrounded by the electrically insulating lining 160 for some distance as it exits the guide 120 via outlet opening 155. The electrically insulating lining 160 extending from second end 150 does not have to completely surround the metal wire 180. For example, a portion of the bottom of the electrically insulating lining 160 can be removed. For example, measured from the horizontal diameter of the electrically insulating lining 160, an arc segment subtending an angle of from about 10° to about 180° can be removed. When the electrically insulating lining 160 has a circular cross section, removal of an arc segment subtending an angle of 180° results in a semi-circular electrically insulating lining 160 covering the upper portion of the metal wire 180.

The guide can be electrically insulated from the metal wire using an electrically insulating lining containing an electrically insulating material suitable for use in the conditions to which the guide would be exposed during welding. The electrically insulating material can be or contain an electrically insulative ceramic. Such ceramics are known in the art and can include the oxides or nitrides of Al, B, Zr, Mg, Y, Ca, Si, Ce, In and Sn and combinations thereof (e.g., see U.S. Pat. No. 6,344,287 (Celik et al., 2002); U.S. Pat. No. 4,540,879 (Haerther et al., 1985); and U.S. Pat. No. 7,892,597 (Hooker et al., 2011)). The electrically insulating material can be or contain aluminum nitride, aluminum oxide, magnesium nitride, magnesium oxide, quartz, silicon nitride, boron nitride, zirconium dioxide and mixtures and combinations thereof.

Figures 4A, 4B:
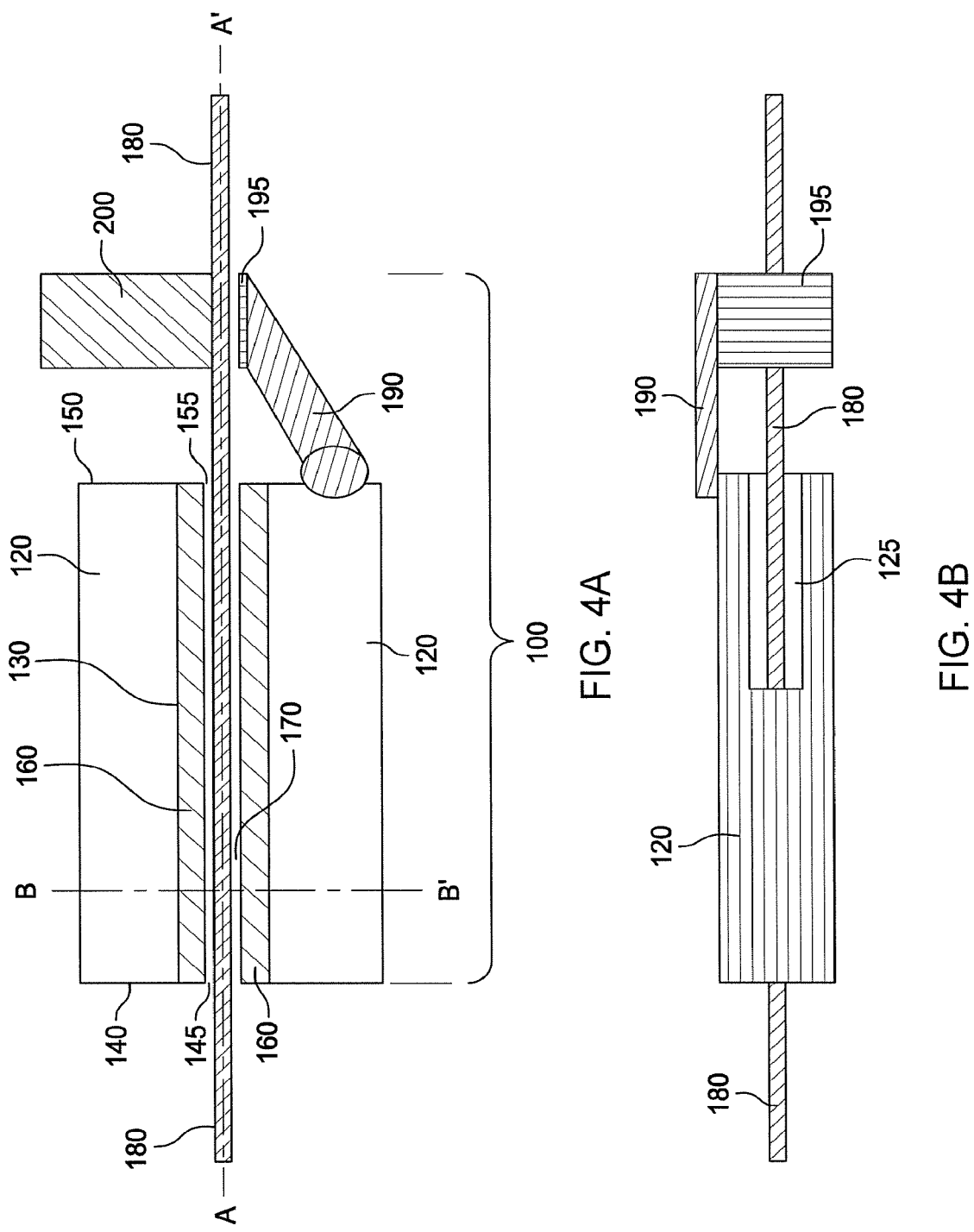
FIG. 4A is a schematic drawing showing a side sectional view of an embodiment of the guide 120 of the contact tip assembly 100 containing a wire pressing assembly 190 below the metal wire 180 and positioned under the electric contact element 200. In the embodiment shown, the cut out section 115 extends to the end of the guide 120, and the electrically insulating lining 160 extends past the guide 120.
FIG. 4B is a schematic drawing showing a bottom view of an embodiment of the guide 120 of the contact tip assembly 100 showing a bottom opening 125 that allows dust or pieces of wire to exit the guide 120 prior to coming near the forming piece. In the embodiment depicted, the bottom opening 125 extends to the second end 150 of the guide 120.
Figure 5:
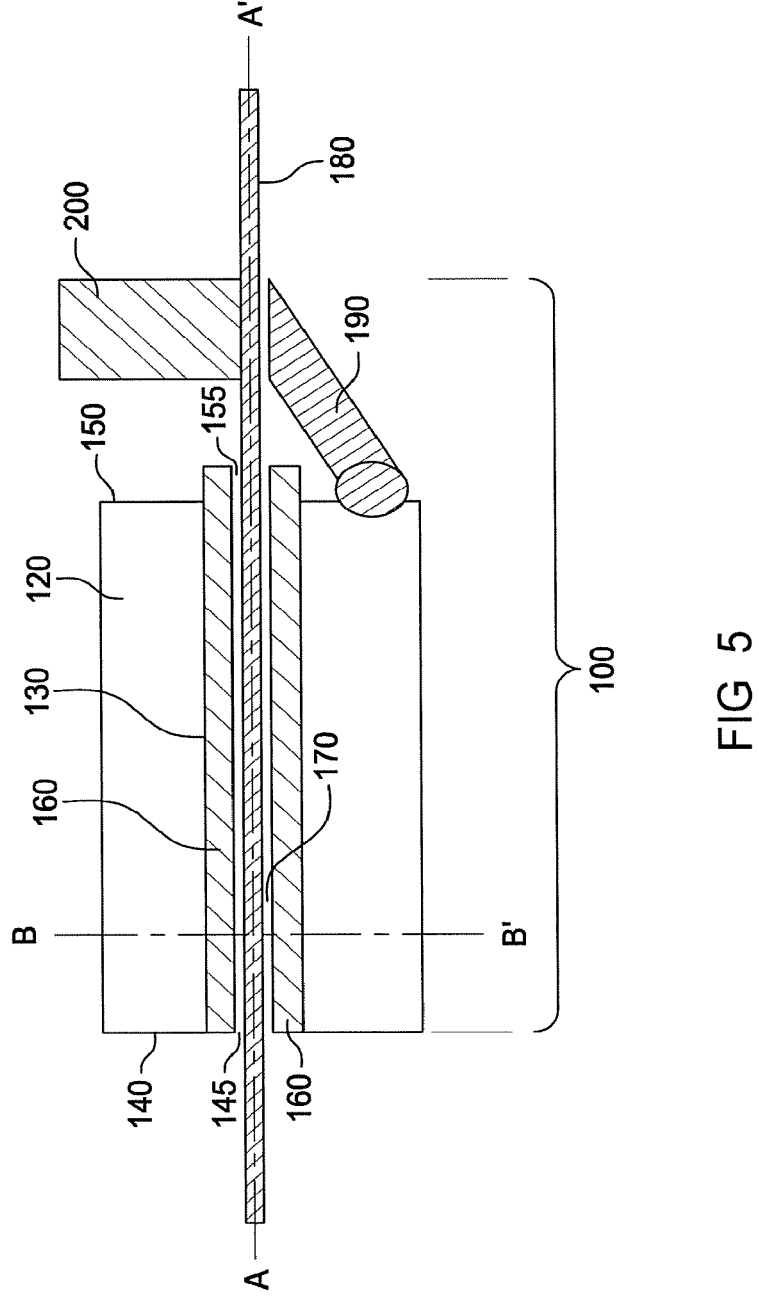
FIG. 5 is a schematic drawing showing a side sectional view of an embodiment of the guide 120 of the contact tip assembly 100 containing a wire pressing assembly 190 below the metal wire 180 and positioned under the electric contact element 200. In the embodiment shown, the electrically insulating lining 160 extends past the guide 120.

The electrically insulating lining can be configured to be contained within the guide. An exemplary embodiment is shown in FIG. 4A, where the electrically insulating lining 160 does not extend past the end of the guide 120. The electrically insulating lining can be configured to extend from one or both ends of the guide. An exemplary embodiment is shown in FIG. 5, where the electrically insulating lining 160 extends past the end of the guide 120.

Figure 2:
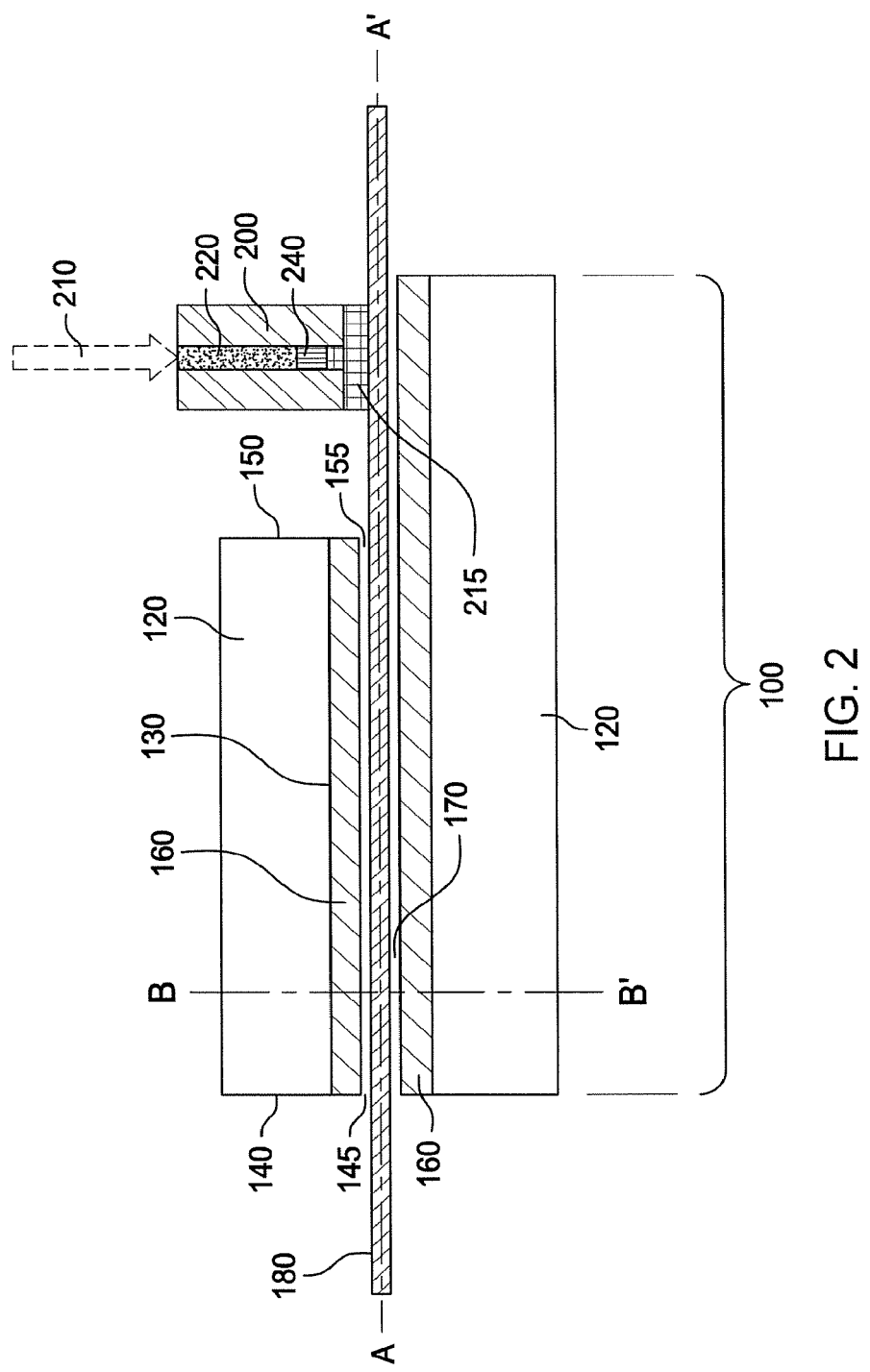
FIG. 2 is a schematic drawing showing a side sectional view of an embodiment of the guide 120 of the contact tip assembly 100 showing the location of a cut out section 115 in the top portion of the guide 120 that can accommodate a portion of the electric contact element 200. In the embodiment shown, the cut out section 115 extends to the end of the guide 120.
Figure 3:
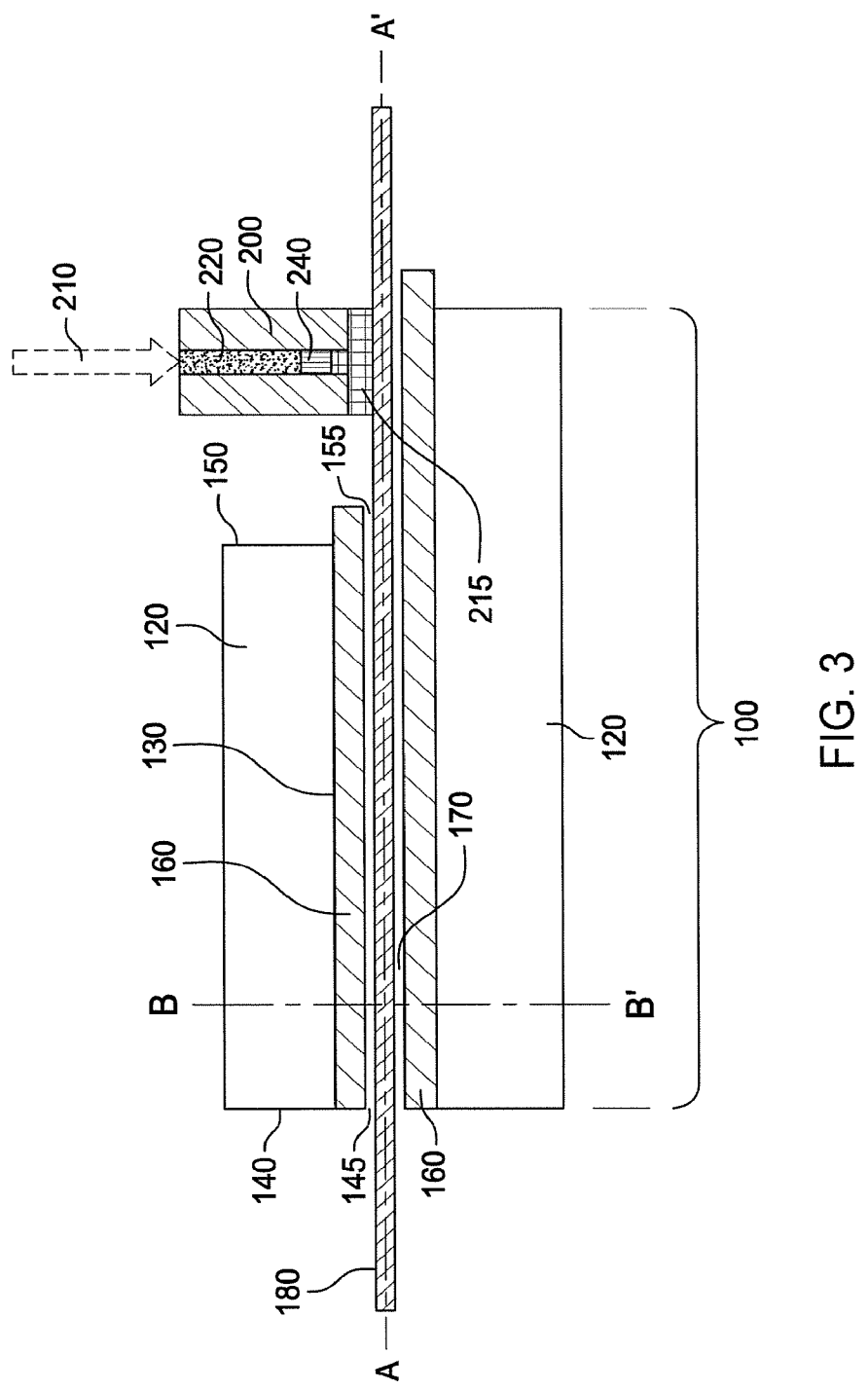
FIG. 3 is a schematic drawing showing a side sectional view of an embodiment of the guide 120 of the contact tip assembly 100 showing the location of a cut out section 115 in the top portion of the guide 120 that can accommodate a portion of the electric contact element 200. In the embodiment shown, the cut out section 115 extends to the end of the guide 120, and the electrically insulating lining 160 extends past the guide 120.

When the cut out section is present, the electrically insulating lining can be configured to be contained within the guide and not extend into the cut out section or extend past the end of the guide. An exemplary embodiment is shown in FIG. 2, where electrically insulating lining 160 is contained within the guide 120. In some embodiments when the cut out section is present, the electrically insulating lining can be configured to extend into the cut out section or extend past the end of the guide or both. An exemplary embodiment is shown in FIG. 3, where electrically insulating lining 160 extends into cut out section 115 and extends past the end of guide 120.

The electrically insulating lining can contain a central bore through which the metal wire can pass. The central bore typically is of a shape that easily accommodates the metal wire. For example, when the metal wire is a wire having a circular cross section, the electrically insulating lining includes a central bore with a circular cross section. The central bore of the electrically insulating lining generally is of a diameter that is slightly larger than the diameter of the metal wire. This accommodates any variation in the size of the cross-section of the metal wire, such as variation in wire diameter. For example, when the metal wire is a metal wire, the wire diameter can have a certain variation of diameter, and a tolerance in variation can be used to determine the size of the central bore of the electrically insulating lining. For example, the central bore of the electrically insulating lining can be sized to accommodate the diameter of a metal wire in the form of a metal wire plus a variance tolerance of 0.01 mm The diameter of the metal wire, according to certain embodiments of the present invention, can range from about 0.8 mm to about 5 mm. The metal wire can have any practically implementable dimension, e.g., 1.0 mm, 1.6 mm, 2.4 mm, etc. The feed rate and positioning of the metal wire can be controlled and modulated in accord with the effect of the power supply to the PAW torch in order to ensure that the metal wire is being continuously heated and is melted when it reaches the intended position above the preheated area of the base material.

When the electrically insulating lining includes an insulative ceramic in the vicinity of the central bore through which the metal wire passes, the insulative ceramic can include a surface treatment to reduce the roughness of the surface of the metal wire insulative ceramic. The surface treatment can help to minimize or eliminate scratching or scoring of the metal wire as it passes through the electrically insulating lining. For example, the surface of the electrically insulating lining can be treated to include a surface glaze that reduces the friction-causing attraction forces between the lining surface and the electrode. Laser glazing treatment can be used to reduce surface pores, cracks or deformations on the surface to reduce friction and produce a smoother insulative ceramic surface. The surface of the electrically insulating lining can be treated to include a diamond-like-carbon coating. A synthetic fluoropolymer, such as polytetrafluoroethylene (PTFE) can be applied to the surface of the electrically insulating lining to reduce friction. The surface treatment can help to minimize the formation of small pieces of metal wire that can form due to interaction of the metal wire with a rough insulative ceramic surface. In each of FIGS. 6A, 6B, 7A and 7B, an optional coating 165 is shown on the surface of the electrically insulating lining 160 facing center bore 130.

The electrically insulating lining 160 can be of any shape, as long as it is configured to have a center bore 130 that receives a metal wire 180 and allows the metal wire 180 to pass through the electrically insulating lining 160. The shape of the outer portion of the insulating lining 160 can have a cross section that is circular, oval, elliptical, or polygonal, for example, square, triangular, rectangular, pentagonal, hexagonal, or octagonal. As depicted in FIGS. 6A and 7B, the electrically insulating lining 160 can have a substantially circular cross section with a center bore 130 that has a circular cross section. FIGS. 6B and 7A show an electrically insulating lining 160 that has a square cross section with a center bore 130 that has a circular cross section.

The electric contact unit contains a replaceable contact tip that is brought into contact with the metal wire. As discussed earlier, the contact tip may have a curved or semi-curved surface sized to accommodate the wire. Also, the surface area of the contact tip can be large enough to help avoid overheating caused by the current transfer. In exemplary embodiments, the width or thickness of the contact tip can range from about 1 mm to about 10 mm. The contact tip electrically connects the metal wire to a direct current power source. The electrical connection can be made so that a circuit is formed that connects the power source, the electrode of a PTA torch and the metal wire (via the replaceable contact tip). When the metal wire enters the arc of the PTA torch, the plasma plume including electric arc delivers a highly concentrated heat flow to a small surface area of the metal wire. The PTA torch can have an electrode made of tungsten and a nozzle made of copper or copper alloy. However, the invention is not tied to any specific choice or type of PTA torch. Any known or conceivable device able to function as a PTA torch can be used. Also, the invention may be implemented using a PAW torch that is not a PTA torch.

In the methods provided, welding by melting a metal wire heated by an electric arc (gas metal arc welding or GMAW), particularly using non-reactive gases to make the arc (metal inert gas welding or MIG-welding) is used in the solid free form fabrication of a metal object. In these methods, a metal wire is made to melt in the plasma produced by torch using an electric arc, and the melting metal wire is deposited onto the workpiece to add to and form the near net shape metal bodies.

An electrically insulating material also can be used to isolate the electric contact unit from the arc of a PTA torch. The electrically insulating material can be positioned at the outlet opening of the guide of the metal wire so that it extends some distance from the outlet opening. The length of the electrically insulating material extending from the outlet opening can be 0.1 to 10 mm, or from about 0.5 to 5 mm, or about 1 mm.

In some embodiments, the electric contact unit can be positioned within a cut out section of the metal wire guide and the guide can include an electrically insulating material that is positioned at the outlet opening of the guide. An exemplary embodiment is shown in FIG. 8, which shows cut out section 115 of guide 120 for receiving the electric contact unit 200, and electrically insulating material 160 extending past the end of the guide 120.

The electrically insulating material can include any material suitable for use at the temperatures near the plasma arc. The electrically insulating material can be or contain an electrically insulative ceramic. Such ceramics are known in the art and can include the oxides or nitrides of Al, B, Zr, Mg, Y, Ca, Si, Ce, In and Sn and combinations thereof (e.g., see U.S. Pat. No. 6,344,287 (Celik et al., 2002); U.S. Pat. No. 4,540,879 (Haerther et al., 1985); and U.S. Pat. No. 7,892,597 (Hooker et al., 2011)). The electrically insulating material can be or contain aluminum nitride, aluminum oxide, magnesium nitride, magnesium oxide, quartz, silicon nitride, boron nitride, zirconium dioxide and mixtures and combinations thereof.

The contact tip within the electric contact unit contains copper or a copper alloy. Contact tips are commercially available (e.g., from Brouwer Metaal b.v.), and the invention is not limited to any specific type of contact tip. The contact tip can be attached to a cylindrical support within the electric contact unit. In some embodiments, the contact tip is thermally insulated from the cylindrical support by using an intervening thermal insulating material. Any thermal insulating material that can withstand the temperatures to which the contact tip could be exposed are appropriate for use within the electric contact unit. An exemplary thermal insulating material is ceramic, which also can be selected to be electrically insulative, which would minimize or prevent any of the electric current from being transferred from the contact tip to the electric contact unit. Any of the ceramics described above could be used to construct an appropriate fitting for attaching the contact tip to the cylindrical support within the electric contact unit.

The contact tip within the electric contact unit is maintained in contact with the metal wire to insure constant current to the metal wire and a completed circuit of containing the power source, metal wire and the target area. In some embodiments, the contact tip is maintained in contact with the metal wire via a contact tip pressing assembly. The contact tip pressing assembly can be part of the electric contact unit, or can be a separate element. As shown schematically in FIG. 6A, the contact tip pressing assembly 210 can exert a downward pressure against the contact tip support 220 to press the contact tip 215 into contact with the metal wire 180. The downward pressure to keep the contact tip 215 into contact with the metal wire 180 can be achieved by using, e.g., a spring, hydraulics, mechanized screws or a motorized piston assembly. When a spring is used, the spring can be selected to exert a force of appropriate strength or magnitude so that it is not so strong that the contact tip 215 scratches the metal wire 180 but strong enough to maintain contact between the contact tip 215 and the metal wire 180. Depending on the configuration chosen, a spring, such as a compression spring, having a spring constant of from about 0.001 to about 10 N/m can be used to force the contact tip 215 down against metal wire 180.

In some embodiments, the contact tip is maintained in contact with the metal wire via a wire pressing assembly. As shown schematically in FIG. 9, the wire pressing assembly 190 can exert an upward pressure against the metal wire 180 as is passes over the wire pressing assembly 190 to press the metal wire 180 into contact with the contact tip 215. The upward pressure to keep the metal wire 180 in contact with the contact tip 215 can be achieved, for example, by using, e.g., a pin, lever or clip, such as an L-shaped clip, attached to a spring, hydraulics, mechanized screws or a motorized piston assembly. The pin or clip contacts the metal wire and pushes the metal wire upwards into contact with the contact tip. The upward force can be provided by a spring, hydraulics, mechanized screws or a motorized piston assembly or combinations thereof. The force to press the metal wire into contact with the contact tip can be selected to be of appropriate strength or magnitude so that it is not so strong that the contact tip 180 or wire pressing assembly 190 scratches the metal wire, e.g., metal wire, but strong enough to maintain continuous contact between the contact tip 215 and the metal wire 180. Depending on the configuration chosen, a spring, such as a compression spring having a spring constant of from about 0.001 to about 10 N/m can be used, alone or in combination, to force the wire pressing assembly 190 up toward the contact tip 215. In some embodiments, a combination of a contact tip pressing assembly to press the contact tip downward, and a wire pressing assembly to press the metal wire upward, is used. Alternatively, the contact tip pressing assembly presses upward and the wire pressing assembly presses the metal wire downward. In yet alternative embodiments, the contact tip assembly does not press, and the wire is contacted to the contact tip only by the metal wire pressing assembly. Alternatively, no wire metal pressing assembly is used and the contact tip is pressed against the wire by the contact tip assembly. In yet an alternative embodiment, no pressure is applied to either the metal wire or the contact tip.

The wire pressing assembly can include an insulating tip on its surface that interfaces and comes into contact with the metal wire. As shown in FIG. 4A, an optional insulating tip 195 is shown on the surface of the wire pressing assembly 190 and it is the insulating tip 195 that contacts the metal wire. The insulating tip can be made of any material compatible with the environment and temperature to which the contact tip would be exposed. For example, the insulating tip on the wire pressing assembly can be or contain an electrically insulative ceramic. Exemplary ceramics include the oxides or nitrides of Al, B, Zr, Mg, Y, Ca, Si, Ce, In and Sn and combinations thereof. The electrically insulating material can be or contain aluminum nitride, aluminum oxide, magnesium nitride, magnesium oxide, quartz, silicon nitride, boron nitride, zirconium dioxide and mixtures and combinations thereof.

C. Examples

The following examples are included for illustrative purposes only and are not intended to limit the scope of the embodiments provided herein.

First Example Embodiment

The first example embodiment of the contact tip assembly is shown schematically in FIGS. 1A and 1B. As illustrated in the figure, the contact tip assembly includes a guide 120 having a longitudinal center axis A-A', a first end 140, and an opposite second end 150, and a linear center bore 130 extending and running along the longitudinal center axis of the guide 120 from its first end 140 to its second end 150. Also present is an electrically insulating lining 160 inside of the center bore 130, the electrically insulating lining 160 extending at least from the first end 140 to the second end 150 of the guide 120. The electrically insulating lining 160 includes a guide channel 170 having an inlet opening 145 at the first end 140 and an outlet opening 155 at the second end 150 and running through the linear electrically insulating lining 160 along the longitudinal center axis A-A'. The electrically insulating lining 160 guides a metal wire 180 being passed through the linear cylindrical guide channel 170 from the inlet opening 145 towards and further out of the outlet opening 155 via the center bore 130. The contact tip assembly also includes an electric contact unit 200 containing a contact tip 215 in electric contact with an electric energy source, where the electric contact unit 200 is located at a distance away from the outlet opening 155. The contact tip assembly also includes a contact element pressing assembly 210 for pressing a contact tip 215 of the electric contact unit 200 onto the metal wire 180. As illustrated in FIG. 1B, the bottom of the guide 120 includes a bottom opening 125 that allows dust or pieces of wire to exit the guide 120 prior to coming near the forming piece. In the example embodiment, the guide 120 is made of Ti-6Al-4V alloy, the contact tip 215 is a W/Cu composite, and the contact tip pressing assembly includes a compression spring.

In use, the metal wire 180 is a wire made of Ti-6Al-4V alloy, which is continuously supplied by a wire feeder and enters inlet opening 145 and traverses the guide 120 via the guide channel 170. The contact tip 215 is connected via an insulator connector 240, which is ceramic, to a contact tip support 220, and is pushed down against the metal wire 180 via the force of a compression spring in the contact tip pressing assembly 210. The metal wire exits the guide 120 via outlet opening 155 and is positioned such that its distal end is located above preheated area at the deposition area on the base material. The metal wire is heated at a melting rate of the distal end such that droplets of molten electrode are continuously being supplied to the preheated area of the base material. In some embodiments, droplets of molten electrode are continuously being supplied to a molten pool on the base material.

In exemplary embodiments, a plasma transferred arc is formed by a PTA torch that is electrically connected to a DC power source such that the electrode of the PTA torch becomes the cathode and the metal wire becomes the anode. The plasma transferred arc is continuous and directed to heat and melt the distal end of the metal wire. The effect of the DC power source is modulated to maintain a heating and melting rate in accordance with the feeding velocity of the wire such that the formation of the droplets of molten metal wire, in this example Ti-6AL-4V alloy wire, are timed to maintain a continuous drip of molten wire onto the preheated surface of the base material, or into a molten pool on the base material. The effect supplied by the DC power source and the feeding velocity of the wire are constantly monitored and modulated by a control system such that the preheated area of the base material of the molten pool of the base material is supplied with molten wire at a rate providing the intended deposition rate of the Ti-6Al-4V alloy.

A control system (such as a computer-aided manufacturing system) can be simultaneously engaged to operate and regulate the engagement of one or more actuators (not shown) that constantly positions and moves the base material and one or more PAW or PTA torches such that the intended deposition spot as given by the CAD-model of the object that is to be formed. The control system can also be engaged to operate any actuator controlling a preheating PAW or PTA torch such that a preheated area of the base material, or a molten pool in the base material, is where the melted metallic material is to be deposited.

The control system used in exemplary embodiments of the invention described herein can provide partial or complete automation of the deposition apparatus. The control system can include a computer processor or central processing unit (CPU), CPU display, one or more power supplies, power supply connections, signal modules as inputs and/or outputs, integrated shielding of analog signals, storage devices, circuit boards, memory chips or other storage medium, a non-transitory computer-readable storage medium having a computer-readable program embodied therein, or any combination thereof. The computer-readable program can containing appropriate software for automating any one or combination of systems. Exemplary control modules include, but are not limited to, the SIMATIC-S7-1500 from Siemens AG (Munich, Germany), the IndraMotion MTX system available from Bosch Rexroth AG (Lohr am Main, Germany). And the SIGMATEK C-IPC compact industrial computer system available from SIGMATEK GmbH & Co. KG (Lamprechtshausen, Austria).

Second Example Embodiment

The second example embodiment of the contact tip assembly is shown schematically in FIGS. 4A and 4B. As illustrated in the figure, the contact tip assembly includes a guide 120 having a longitudinal center axis A-A', a first end 140, and an opposite second end 150, and a linear center bore 130 extending and running along the longitudinal center axis of the guide 120 from its first end 140 to its second end 150. Also present is an electrically insulating lining 160 inside of the center bore 130, the electrically insulating lining 160 extending at least from the first end 140 to the second end 150 of the guide 120. The electrically insulating lining 160 includes a guide channel 170 having an inlet opening 145 at the first end 140 and an outlet opening 155 at the second end 150 and running through the linear electrically insulating lining 160 along the longitudinal center axis A-A'. The electrically insulating lining 160 guides a metal wire 180 being passed through the linear cylindrical guide channel 170 from the inlet opening 145 towards and further out of the outlet opening 155 via the center bore 130. The contact tip assembly also includes an electric contact unit 200 containing a contact tip 215 in electric contact with an electric energy source, where the electric contact unit 200 is located at a distance away from the outlet opening 155. The contact tip assembly also includes a wire pressing assembly 190 for pressing the metal wire 180 into contact with the contact tip 115 of the electric contact unit 200. In the example embodiment, the wire pressing assembly 190 has an insulating tip 195 that is ceramic. The wire pressing assembly 190 includes a spring that maintains the insulating tip 195 in contact with the metal wire 180.

In use, the metal wire 180 is a wire made of Ti-6Al-4V alloy, which is continuously supplied by a wire feeder and enters inlet opening 145 and traverses the guide 120 via the guide channel 170. The contact tip 215 is connected via an insulator connector 240, which is ceramic, to a contact tip support 220, which is in a fixed position. The metal wire 180 is pushed up against the contact tip 215 via the force of a compression spring in the wire pressing assembly 190. The metal wire exits the guide 120 via outlet opening 155 and after passing above the wire pressing assembly 190 is positioned such that its distal end is located above the preheated are of the base material at the deposition area on the base material. The metal wire is heated at a melting rate of the distal end such that droplets of molten electrode are continuously being supplied to preheated area on the base material.

A plasma transferred arc is formed by a PTA torch that is electrically connected to a DC power source such that the electrode of the PTA torch becomes the cathode and the metal wire becomes the anode. The plasma transferred arc is continuous and directed to heat and melt the distal end of the metal wire. The effect of the DC power source is modulated to maintain a heating and melting rate in accordance with the feeding velocity of the wire such that the formation of the droplets of molten metal wire, in this example Ti-6AL-4V alloy wire, are timed to maintain a continuous drip of molten wire onto the preheated area on the base material. The effect supplied by the DC power source and the feeding velocity of the wire are constantly monitored and modulated by a control system such that the preheated area of the base material is supplied with molten wire at a rate providing the intended deposition rate of the Ti-6Al-4V alloy. The control system is simultaneously engaged to operate and regulate the engagement of an actuator (not shown) that constantly positions and moves the base material such that the preheated area of the base material to receive the molten metal is located at the intended deposition spot as given by the CAD-model of the object that is to be formed.

It will be apparent to those skilled in the art that various modifications and variation can be made in the present invention without departing from the scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.

A-A' Longitudinal center axis
B-B' Vertical axis
100 Contact tip assembly
110 Distal extension
111 Cut out first wall
112 Cut out entry opening
113 Cut out exit opening
114 Cut out second wall
115 Cut out Section
120 Guide
122 Fastener projection 1
124 Fastener projection 2
125 Bottom opening
127 Protrusion
130 Center bore
140 First end
145 Inlet opening
150 Second end
155 Outlet opening
160 Electrically insulating lining
165 Coating
170 Guide channel
180 Metal wire
190 Wire pressing assembly
195 Insulating tip
200 Electric contact unit
210 Contact tip pressing assembly
215 Contact tip
220 Contact tip support
230 Electrical connection
240 Optional insulator connector
300 Support element
310 Thermally insulating material
400 Metal wire delivery source
500 Frame
600 PAW torch

What is claimed is:

1. A system for solid free form deposition comprising:

a plasma transfer arc torch configured to generate a plasma arc;

a base material positioned proximate the plasma transfer arc torch, the plasma transfer arc torch and the base material being movable relative to each other to facilitate free form deposition of a workpiece on the base material;

a contact tip assembly separate from the plasma transfer arc torch and conducting an electric current to a feed wire during deposition of the workpiece, the contact tip assembly comprising a replaceable contact tip laterally spaced from the welding torch, wherein the replaceable contact tip is configured to be biased into contact with the feed wire and wherein the replaceable contact tip is configured to conduct electrical current from an electrical energy source through the replaceable contact tip and to the feed wire; and a wire guide comprising a first end through which the wire feed enters the wire guide and a second end through which the wire feed exits the wire guide, wherein the replaceable contact tip is disposed to contact the wire feed at a location between the first end and the second end of the wire guide.

2. The system of claim 1, wherein the wire guide is separate and apart from the contact tip assembly.

3. The system of claim 2, the wire guide further comprising an opening at a region above which the contact tip assembly conducts the electric current to the wire feed.

4. The system of claim 1, the contact tip assembly comprising a contact unit containing the replaceable contact tip.

5. The system of claim 4, the contact tip assembly further comprising a pressing assembly connected to the contact unit and configured to press the contact tip of the contact unit onto the feed wire.

6. The system of claim 5, the pressing assembly further comprising a spring, hydraulics, a pneumatic actuator, a mechanized screw, a motorized piston, or any combination thereof.

7. The system of claim 1, further comprising a wire feed pressing assembly configured to press the wire feed against the contact tip assembly.

8. The system of claim 7, wherein the wire feed pressing assembly is connected to a wire guide that is separate and apart from the contact tip assembly.

9. A method of conducting an electrical current to a wire feed during solid free form manufacturing comprising:

feeding the wire feed through a wire guide that is separate and apart from a contact tip assembly and from a welding torch, the wire guide comprising a first end through which the wire feed enters the wire guide and a second end through which the wire feed exits the wire guide;

contacting the wire feed and a replaceable contact tip of the contact tip assembly at a location between the first end and the second end of the wire guide, wherein the contact tip assembly is spaced apart and separate from the welding torch; and conducting an electrical current through the replaceable contact tip to the wire feed.

10. The method of claim 9, wherein the wire guide has an insulating lining defining a guide channel.

11. The method of claim 9, the wire guide comprising a wire feed pressing assembly pressing the wire feed against the contact tip.

12. A contact tip assembly comprising:

a replaceable contact tip;

a contact unit containing the replaceable contact tip;

a pressing assembly connected to the contact unit at an opposite end of the contact unit from where the replaceable contact tip is located; and a wire guide comprising a first end through which a wire feed enters the wire guide and a second end through which the wire feed exits the wire guide, wherein the replaceable contact tip is disposed to contact the wire feed at a location between the first end and the second end of the wire guide, wherein the pressing assembly is configured to apply a force to the contact unit to press the replaceable contact tip into contact with the wire feed, and wherein the replaceable contact tip is configured to conduct an electrical current from an electrical energy source through the replaceable contact tip and to the wire feed.

13. The contact tip assembly of claim 12, further comprising an electrical connection configured to connect the contact tip with an electrical power source.

14. The contact tip assembly of claim 13, wherein the electrical power source comprises a DC power source.

15. The contact tip assembly of claim 13, wherein the electrical power source is coupled to a welding torch.

16. The contact tip assembly of claim 15, wherein the replaceable contact tip, the contact unit, and the pressing assembly are arranged to be spatially separated from the welding torch.

17. The contact tip assembly of claim 16, wherein at least one of the replaceable contact tip, the contact unit, and the pressing assembly is laterally spaced from the welding torch.

18. The contact tip assembly of claim 12, wherein the replaceable contact tip comprises copper or a copper alloy.

19. The contact tip assembly of claim 12, wherein the pressing assembly comprises a spring, hydraulics, a pneumatic actuator, a mechanized screw, a motorized piston, or any combination thereof.

* * * * *